Patented Mar. 31, 1942

2,277,833

UNITED STATES PATENT OFFICE 2,277,833

HIGHER ALKYL SUBSTITUTED PHENOTHIOXINS

Frank B. Smith and Harold W. Moll, Midland, Mich., assignors to The Dow Chemical Company, Midland, Mich., a corporation of Michigan No Drawing. Application June 15, 1940, Serial No. 340,845

5 Claims. (Cl. 260—327)

This invention relates to derivatives of phenothioxin and is particularly concerned with higher alkyl-substituted phenothioxins having the formula

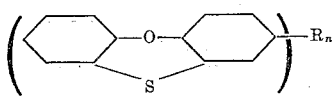

wherein R represents an alkyl radical containing from 8 to 17 carbon atoms, inclusive, and $n$ is an integer not greater than 3.

We have prepared a number of compounds falling within the scope of the foregoing formula and found them to be useful as modifiers in plastic compositions and as intermediates in the preparation of more complex organic derivatives.

The new compounds may be prepared by reacting phenothioxin with an aliphatic alcohol or olefine containing from 8 to 17 carbon atoms, inclusive, in the presence of an acid activated bleaching earth as a catalyst. The reaction is carried out under such conditions of temperature and pressure as favorably influence the introduction of one or more alkyl radicals in one or both of the benzenoid nuclei of the phenothioxin compound. In carrying out the reaction, any suitable proportion of phenothioxin and alcohol or olefine may be employed, a mixture of mono- and poly-alkylated products being generally obtained. The temperature required to cause reaction is between about 175° and about 300° C., although somewhat lower temperatures may be sometimes employed. One method of procedure consists in mixing together phenothioxin, catalyst, and olefine or alcohol and thereafter heating and agitating the mixture under atmospheric pressure until the desired degree of reaction is obtained. Any water formed by alcohol present in the mixture is preferably continuously removed from the reaction zone. The reactor and contents are then cooled, the product filtered to remove catalyst, and the filtrate fractionally distilled under reduced pressure to separate the desired alkylated compound from unreacted phenothioxin or alkylating agent.

The following examples illustrate certain embodiments of the invention with respect to the preparation of new alkyl-substituted phenothioxin compounds but are not to be construed as limiting.

Example 1

400 grams (2 mols) of phenothioxin and 40 grams of a representative acid activated bleaching earth (Retrol) were heated together in a glass-lined reactor equipped with reflux condensor, water separator, mechanical stirrer, thermocouple, and dropping funnel. When the mixture had reached a temperature of 200° C., 260 grams (2 mols) of 2-ethyl-hexanol was added portionwise to the agitated mixture over a period of two hours, the temperature being maintained between 200° and 230° during the addition. Water was removed from the reaction zone as formed. After all the alcohol was added, heating was continued for one hour, after which the product was filtered to remove the acid activated bleaching earth. The filtrate, a golden yellow fluorescent oil, was fractionally distilled, whereby there was obtained as a primary product of reaction a mono-octyl phenothioxin fraction boiling at 222°–300° C. at 20 millimeters pressure. This product had a specific gravity of 1.066 at 25°/25° C., a refractive index of 1.578 at $n$ 25° C./D, and a molecular weight of 340. A residual product boiling above 300° C. at 20 millimeters pressure consisted of a viscous oil having a specific gravity of 1.023 at 25°/25° C., a refractive index of 1.563 at $n$ 25° C./D, and a molecular weight of 553. This material consisted essentially of tri-octyl phenothioxin.

Example 2

In a similar manner 300 grams (1.5 mols) of phenothioxin and 279 grams (1.5 mols) of n-dodecyl alcohol were reacted together at 230°–240° C. in the presence of 35 grams of acid activated bleaching earth (Retrol). The resulting yellow fluorescent oil was fractionally distilled to obtain a mono-dodecyl phenothioxin fraction as a yellow viscous oil boiling between 270° C. at 20 millimeters pressure and 300° C. at 12 millimeters pressure. This product had a specific gravity of 1.027 at 25°/25° C., a refractive index of 1.56 at $n$ 25° C./D, and a molecular weight of 350. A residual product boiled above 300° C. at 12 millimeters pressure and consisted essentially of a mixture of mono- and di-dodecyl phenothioxin as a red viscous oil having a specific gravity of 0.980 at 25°/25° C., a refractive index of 1.540 at $n$ 25° C./D, and a molecular weight of 420.

Example 3

300 grams (1.5 mols) of phenothioxin and 209 grams (0.88 mol) of heptadecylene (B. P. 175°–200° C. at 20 millimeters pressure) were reacted at 240° C. in the presence of 31 grams of the acid activated bleaching earth catalyst substantially as described in Example 1. Fractional distillation of the resulting crude product resulted in the separation of a mono-heptadecyl phenothioxin fraction as an amber viscous oil boiling between 260° C. at 5 millimeters pressure and 315° C. at 6 millimeters pressure. This product had a specific gravity of 0.995 at 25°/25° C., a refractive index of 1.554 at $n$ 25°C./D, and a molecular weight of 410.

By reacting phenothioxin with such olefines and alcohols as di-isobutylene, n-decanol, hexadecylene, and the like as disclosed in the foregoing examples, compounds such as di-octyl phenothioxin, mono-decyl phenothioxin, di-decyl phenothioxin, mono-hexadecyl phenothioxin, and the like may be obtained. The present application is a continuation-in-part of our copending application Serial Number 272,816, filed May 10, 1939.

While the examples disclose the use of "Retrol" as the catalytic agent, it is to be understood that the invention is in no sense limited thereto. While "Retrol" is a representative acid activated bleaching earth, at the present time commercially available, other activated bleaching earth products may be similarly employed. Such materials are also commonly identified as surface active siliceous clay catalysts.

Other modes of applying the principles of the invention may be employed instead of those explained, change being made as regards the materials employed, provided the products set forth in the following claims be thereby obtained.

We, therefore, particularly point out and distinctly claim as our invention:

1. A compound having the formula

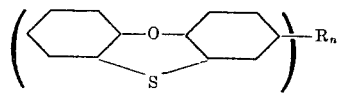

wherein R represents an alkyl radical containing from 8 to 17 carbon atoms, inclusive, and n is an integer not greater than 3.

2. A compound having the formula

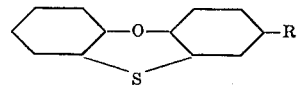

wherein R represents an alkyl radical containing from 8 to 17 carbon atoms, inclusive.

3. A compound having the formula

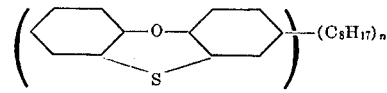

wherein $n$ is an integer not greater than 3.

4. A compound having the formula

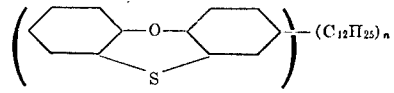

wherein $n$ is an integer not greater than 3.

5. A compound having the formula

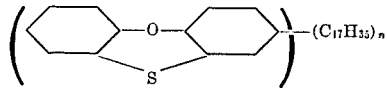

wherein $n$ is an integer not greater than 3.

FRANK B. SMITH.
HAROLD W. MOLL.